(12) United States Patent
Xu et al.

(10) Patent No.: US 6,347,869 B1
(45) Date of Patent: Feb. 19, 2002

(54) CONVEX LENS AND STEPPED PRISM COMBINED GLASSES

(76) Inventors: Shuxiang Xu; Xiaogang Xu, both of No. 38, 4-J-501, Taiping Rd., Haidian District, Beijing (CN), 100039

( * ) Notice: Subject to any disclaimer, the term of this patent is extended or adjusted under 35 U.S.C. 154(b) by 0 days.

(21) Appl. No.: 09/575,999

(22) Filed: May 23, 2000

(30) Foreign Application Priority Data

May 24, 1999 (CN) .............................. 99211181

(51) Int. Cl.[7] .............................. G02C 7/02; G02C 7/06

(52) U.S. Cl. .......................... 351/175; 351/41; 351/176

(58) Field of Search .................. 351/159, 175, 351/176, 41

(56) References Cited

U.S. PATENT DOCUMENTS

| | | | | |
|---|---|---|---|---|
| 3,628,854 A | * | 12/1971 | Jampolsky | 351/175 |
| 3,904,281 A | * | 9/1975 | Jampolsky | 351/175 |
| 5,076,665 A | | 12/1991 | Petersen | 351/175 |
| 5,204,702 A | | 4/1993 | Shapiro | 351/175 |
| 5,381,191 A | | 1/1995 | Levy | 351/175 |

* cited by examiner

Primary Examiner—Scott J. Sugarman
(74) Attorney, Agent, or Firm—Needle & Rosenberg, P.C.

(57) ABSTRACT

A pair of glasses for sustained close distance work includes a pair of integrated convex lens and stepped prism based-in. The thickness and weight of the lens will be reduced because it is made of optical resin and the prism is step shaped. The glasses can turn the near object light into the far object light, so that the eyestrain caused by sustained near work will be significantly reduced and the primary postnatal environment factor leading to myopia will be thoroughly eliminated.

5 Claims, 1 Drawing Sheet

CONVEX LENS AND STEPPED PRISM COMBINED GLASSES

This application claims priority under 35 U.S.C. §§119 and/or 365 to CN99211181.1 filed in China on May 24, 1999; the entire content of which is hereby incorporated by reference.

BACKGROUND OF THE INVENTION

This invention relates to a pair of glasses used for short distance activities for extended periods of time. By wearing it, the eyestrain and acquired myopia can be reduced or prevented.

In ancient times people always engaged in hunting, plowing and weeding under the wide natural environment, and the eyes were primarily used for viewing distance. But along with the enhancement of productivity and the progress of society, changes have been taking place in labour mode and life style. Meanwhile, the outdoor activities have been being gradually replaced by indoor close activities. Because of sustained viewing near object and continuous accommodation and convergence, a series of symptoms of eyestrain occur, such as giddiness, photophobia, diplopia, afterimages, blurred vision, etc. As a result of the combined pulling and oppressing effect of intraocular and extraocular muscles, the eyeball axis gets longer and the radius of cornea curvature becomes shorter, so myopia occurs. In order to reduce eyestrain and prevent myopia, people make a suggestion for sustained near work: taking some rests and far-gazing, keeping-fit massage of eye, proper illuminating for reading and writing, printing in sharp contrast, seating in right posture, keeping proper viewing distance for reading and so on. These measures are not doubt benefit to vision protection, but can far not shake the foundation giving rise to eyestrain and myopia —sustained viewing near object and continuous accommodation and convergence. Some investors presented a kind of glasses having base-in prism lenses in their patents (U.S. Pat. No. 5,076,665 to Mardian, U.S. Pat. No. 5,204,702 to Shapiro, U.S. Pat. No. 5,381,191 to Levy). The purpose of those inventions is for reducing eyestrain. However, those glasses are not very satisfied for long-period wearing due to overweight. Though the glasses mounted on computer monitor can get rid of wearing problem, they restrict the head movement freedom, so as to bring about some new problems such as muscles ache of neck and back, physical fatigue and so on.

An object of the present invention is to provide an optical measure to transform the near object view into far object view, so as to eliminate the primary postnatal environment factor causing eyestrain and myopia.

Another object of the present invention is to provide a pair of light glasses for sustained reading or watching at computer monitor screen to reduce eyestrain.

A further object of the present invention is to provide a pair of glasses allowing eyes in orthophoric state in clear focus without accommodation and convergence when watching at close object.

A still further object of the present invention is to provide a method by means of which one can choose a pair of suitable inventive glasses easily on basis of different diopter of each individual.

BRIEF DESCRIPTION OF THE INVENTION

The inventive glasses can be implemented as follows: The said convex lens and stepped prism in a unitary configuration are made of thermosetting optical resin, such as allyl diglycol carbonate (CR-39), or thermoplastic optical resin, such as acrylic resin, by injection-mold way. Through lens-hardening, edge-grinding and framing, the glasses having lenses of front convex surface and back stepped prism with its base towards the nose will then be made.

The dioptric power of the lens is determined by the object-viewing distance. While measuring the object-viewing distance $d$, the interpupillary distance $d_e$ and the distance $d_g$ from eye to lens of glasses by the meter, the dioptric power of the lens $D_l$ by the diopter (D) and the dioptric power of the prism $D_p$ by the prism diopter $\Delta$, the relations for emmetropia with or without presbyopia are:

$$D_l = 1/(d - d_g) \qquad \text{(I)}$$

$$D_p = 100(0.5\, d_e/d) \qquad \text{(II)}$$

For example, if the object-viewing distance for reading is 0.3 m and the interpupillary distance is 0.06 m, the dioptric power of the lens and the prism should be +3.5D and $10^\Delta$ respectively. While operating the computer, the screen-viewing distance is about 0.5 m, so the dioptric power of the lens and prism are equal to +2.0D and $6^\Delta$ respectively. The above mentioned object-viewing distance indicates the distance between the eye and the gazed object point. In order to simplify the calculation of the dioptric power of the stepped prism, the object-viewing distance is used instead of the direct distance from the eye to the gazed object plane in equation (II). The above said prism diopter $\Delta$ is an optometric terms, namely, one $\Delta$ means that the light beam through a prism deflects one centimeter at the place of 1 meter away.

By wearing the selected diopter glasses, the eyes can view the object at or within the predetermined distance without or with a little accommodation and convergence. Therefore, the eyestrain from sustained watching at close object will be greatly reduced. As for ametropia (myopia or hyperopia), the calculating method of diopter power of the stepped prism of the said glasses is as same as that for emmetropia, but the calculating method of dioptric power of the lens is different. Suppose $D_a$ is the required diopter of the lens for ametropia, $D_r$ is the diopter of the distance-viewing prescription for said ametropia, and $D_l$ is the lens diopter required for emmetropia, the $D_a$ is equal to the algebraic sum of $D_l$ and $D_r$, the relationship among them can be expressed as:

$$D_a = D_l + D_r \qquad \text{(III)}$$

For example, if the diopter of distance-viewing prescription for myopia is −3.0DS, the selected lens diopter of said glasses for object-viewing distance of 0.3 m and 0.5 m is +0.5DS and −1.0DS respectively. Thus it can be seen that sometimes the lenses of said glasses for myopia are not convex but concave. For another example, if the diopter of distance-viewing prescription for hyperopia is +3.0DS, the diopter of selected lenses of said glasses for object-viewing distance of 0.3 m and 0.5 m is +6.5DS and +5.5DS respectively.

The step numbers of stepped prism in this invention are equal to or more than 3. The more the number of steps, the thinner the base of the stepped prism is and the lighter the stepped prism is. But too more numbers of steps may decrease the clarity due to interference of vertical line and resulting manufacturing difficulties, so that 5–35 steps or the interval distance being 1.5 mm–10 mm are appropriate.

The advantages of this invention are as follows: (1) Said glasses are comparatively light. (2) When wearing said glasses, one can gaze at near object, without accommodation and convergence as gaze at far object. So that the strain of intraocular and extraocular muscles, giddiness, ocular blood circulation obstacle and the eyeball-deforming force caused by near reflex when being engaged in sustained close range work would not occur. (3) The normal function of accommodation and convergence will not be affected because these said glasses are not worn for short-time close work or intermittent close range work but only for sustained close range work. (4) The glasses presented in this patent can not only reduce the eyestrain during engaging in sustained near work, but also prevent myopia. For reason given above, these glasses can be extensively used regardless of old or young, and emmetropia, hyperopia or presbyopia.

The selected dioptric power of these convex lenses of said glasses depends on the eye dioptric power and the object-viewing distance. Suppose the interpupillary distance is 0.06 m and the object-viewing distance is 0.3 m and 0.5 m respectively, the selected dioptric power of convex lenses for emmetropia is 3.5D and 2.0D respectively. While for ametropia, the final selected dioptric power of convex lenses should be the algebraic sum of the above-calculated diopter and the distance-viewing prescription diopter of the myopia or hyperopia.

Some examples of selected diopter are listed in Table 1.

TABLE 1

| Object-viewing distance (m) | emmotropia with or without presbyopia | Prescription of myopia (−D) | | | | | | prescription of hyperopia (D) | | |
|---|---|---|---|---|---|---|---|---|---|---|
| | | 1 | 2 | 3 | 4 | 5 | 6 | 1 | 2 | 3 |
| 0.3 | +3.5DS 10$^\Delta$P | +2.5DS 10$^\Delta$P | +1.5DS 10$^\Delta$P | +0.5DS 10$^\Delta$P | −0.5DS 10$^\Delta$P | −1.5DS 10$^\Delta$P | −2.5DS 10$^\Delta$P | +4.5DS 10$^\Delta$P | +5.5DS 10$^\Delta$P | +6.5DS 10$^\Delta$P |
| 0.5 | +2.0DS 6$^\Delta$P | +1.0DS 6$^\Delta$P | 0.0DS 6$^\Delta$P | −1.0DS 6$^\Delta$P | −2.0DS 6$^\Delta$P | −3.0DS 6$^\Delta$P | −4.0DS 6$^\Delta$P | +3.0DS 6$^\Delta$P | +4.0DS 6$^\Delta$P | +5.0DS 6$^\Delta$P |

Figure 3:
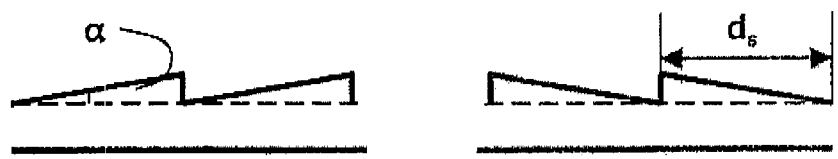

FIG. 3 is a magnified horizontal section diagram of the preferred embodiment of the invention showing a part of left and right stepped prism lenses.

Legend in FIGS.: 1—optical resin lens; 2—convex part of the lens; 3—stepped prism part of the lens; 4—frame; 5—near object point being gazed at; $d_s$—interval distance of stepped prism; E—eyeball; $\alpha$—vertex angle of stepped prism.

DETAILED DESCRIPTION OF THE INVENTION

Figure 1:
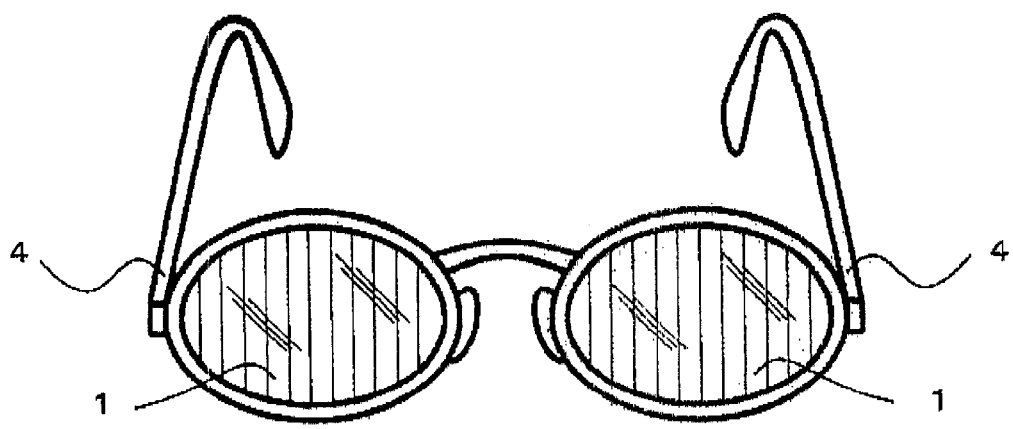
FIG. 1 is a front view of one preferred embodiment of the invention.
Figure 2:
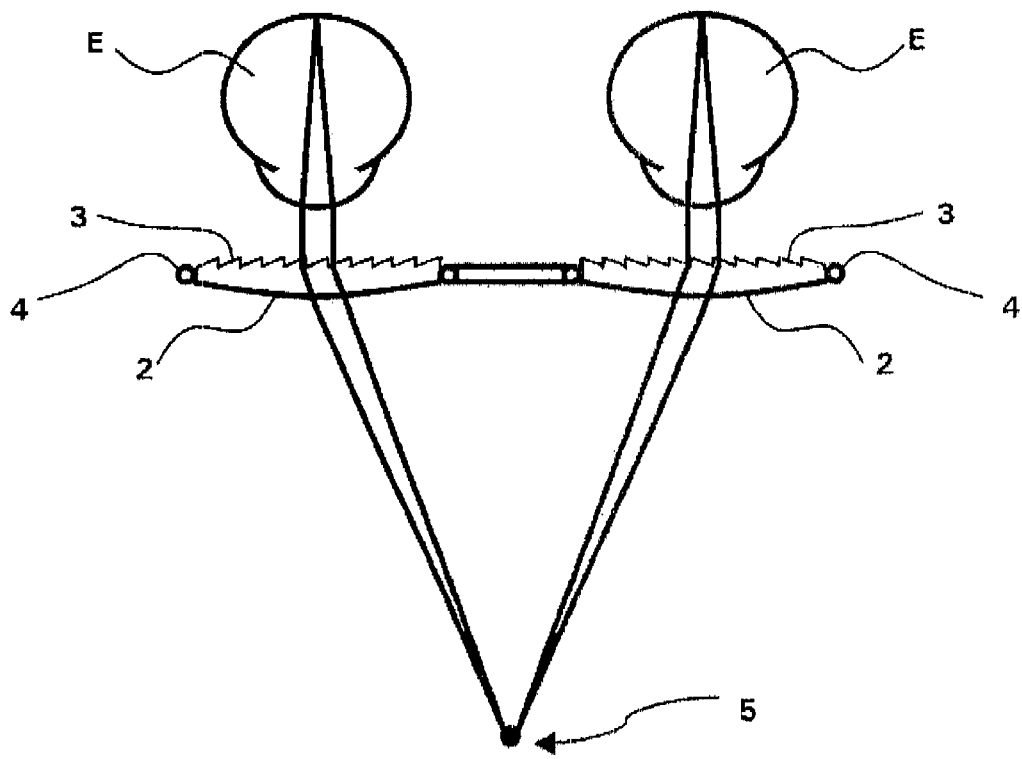
FIG. 2 is a horizontally sectional view of the preferred embodiment of the invention.

One embodiment of this invention is that the lenses 1 showed in FIG. 1 are installed on the glasses frame 4. In FIG. 2 each lens is composed of integrated convex lens 2 and stepped prism 3. Of which the convex surface faces towards object and the stepped prism surface faces towards eye. The scattered light from the object point 5 is turned into obliquely incident collimated light by convex lens 2 and then turned into frontally incident collimated light right towards the eye by stepped prism 3 in FIG. 2. In other words, the near object light is transformed into far object light by these said glasses. In this way, like watching at the far object, the eyes can watch at the near object without accommodation and convergence.

The transverse section in FIG. 3 shows saw-toothed shape. While linking the groove buttom of each sawtooth with dotted line, a plurality of same right triangle appears, the distance $d_x$ between two sawtooth tip is the stepping interval distance. The angle $\alpha$ formed by hypotenuse and dotted line is the vertex angle of the stepped prism which can be calculated by the following equation:

$$\sin \alpha = n\{\sin \alpha \cdot \cos[\sin^{-1}(0.5\ d_c/nd)] - \cos \alpha \cdot \sin[\sin^{-1}(0.5\ d_c/nd)]\} \quad (IV)$$

In which n is the refractive index of resin used for said glasses, d is the object-viewing distance and $d_c$ is the interpupillary distance.

Another embodiment of the present invention is that the stepped prism lenses and the fram are integrated injection-molded.

What is claimed is:

1. A pair of glasses for sustained short distance work, including two lenses and a frame, the glasses comprising an integrated front lens and a back stepped prism having a base towards a wearer's nose, wherein a dioptric power of the lens and the stepped prism is determined by an object-viewing distance (when measuring the object-viewing distance by meter), wherein the dioptric power (D) of a convex lens is the reciprocal of the difference between the object-viewing distance and a distance from a wearer's eye to a lens of the glasses, and wherein the prism diopter ($\Delta$) of the stepped prism is equal to 50 times the quotient of an interpupillary distance divided by the object-viewing distance.

2. The glasses of claim 1, characterized in that for ametropia, the final selected dioptric power of convex lenses is an algebraic sum of a calculated diopter for emmetropia and a distance-viewing prescription diopter of myopia or heperopia so the lens can be convex or concave.

3. The glasses of claim 1, wherein the step numbers of the step shaped prism are equal to or more than 3.

4. The glasses of claim 1, where an interval distance of the stepped prism is 1.5 mm to 10 mm.

5. The glasses of claim 1, wherein a transverse section of the stepped prism has a saw-toothed shape which is a plurality of the same right triangles with a hypotenuse facing the wearer's eye and a vertex angle a determined by the equation:

$$\sin \alpha = n\{\sin \alpha \cdot \cos[\sin^{-1}(0.5d_c/nd)] - \cos \alpha \cdot \sin[\sin^{-1}(0.5d_c/nd)]\};$$

where n is the refractive index of a resin used to prepare the glasses, d is the object-viewing distance and $d_c$ is the interpupillary distance.

* * * * *